I. M. SMITH.
CLUTCH CONTROLLER.
APPLICATION FILED MAR. 7, 1911.

1,050,571.

Patented Jan. 14, 1913.

Witnesses
J. E. Strohl
Francis Boyle

Inventor
Irvine M. Smith.

By Chandler & Chandler
Attorneys

UNITED STATES PATENT OFFICE.

IRVINE M. SMITH, OF TILLAMOOK, OREGON.

CLUTCH-CONTROLLER.

1,050,571.     Specification of Letters Patent.     Patented Jan. 14, 1913.

Application filed March 7, 1911. Serial No. 612,768.

*To all whom it may concern:*

Be it known that I, IRVINE M. SMITH, a citizen of the United States, residing at Tillamook city, in the county of Tillamook, State of Oregon, have invented certain new and useful Improvements in Clutch-Controllers; and I do hereby declare the following to be a full, clear, and exact description of the invention, such as will enable others skilled in the art to which it appertains to make and use the same.

This invention relates to automobile attachments designed to prevent a sudden engagement of the cone clutch and thus jerking of the machine or slipping of the drive wheels on engaging the clutch to start the machine positively prevented.

A second object of the invention is to provide a pneumatic cylinder into which air is drawn as the clutch pedal is depressed to disengage the clutch, this air slowly releasing from the cylinder after the removal of the foot from the pedal and permitting of the pedal being very slowly and uniformly returned to its initial position and the cone clutch thereby uniformly and without shock engaged.

A third object of the invention is to provide a simple and strong linkage between the cone clutch pedal and pneumatic cylinder, which linkage may be adjusted to vary the length of stroke of the piston in the cylinder so that any desired quantity of air may be stored within the cylinder at the time of depression of the cone clutch pedal so that a comparatively quick or comparatively slow engagement of the clutch may be effected upon removal of the foot from the pedal.

In various forms of clutches, gradual clutch engaging qualities are secured by means of flat springs acting against the main clutch spring, and since the main spring must have time in which to overcome the numerous small flat springs a clutch of this kind does not grab and the engagement is gradual. In this form of gradual engagement clutch, there is little chance for adjusting the engagement to suit varying conditions of service so that a still further object of this invention is to provide a mechanism for adjusting the gradual engagement of the clutch to suit varying conditions of service.

With the above objects in view the invention consists in certain novel details of construction and combination of parts hereinafter fully described and claimed, it being understood that various modifications may be made in the minor details of construction within the scope of the appended claim.

Figure 1:
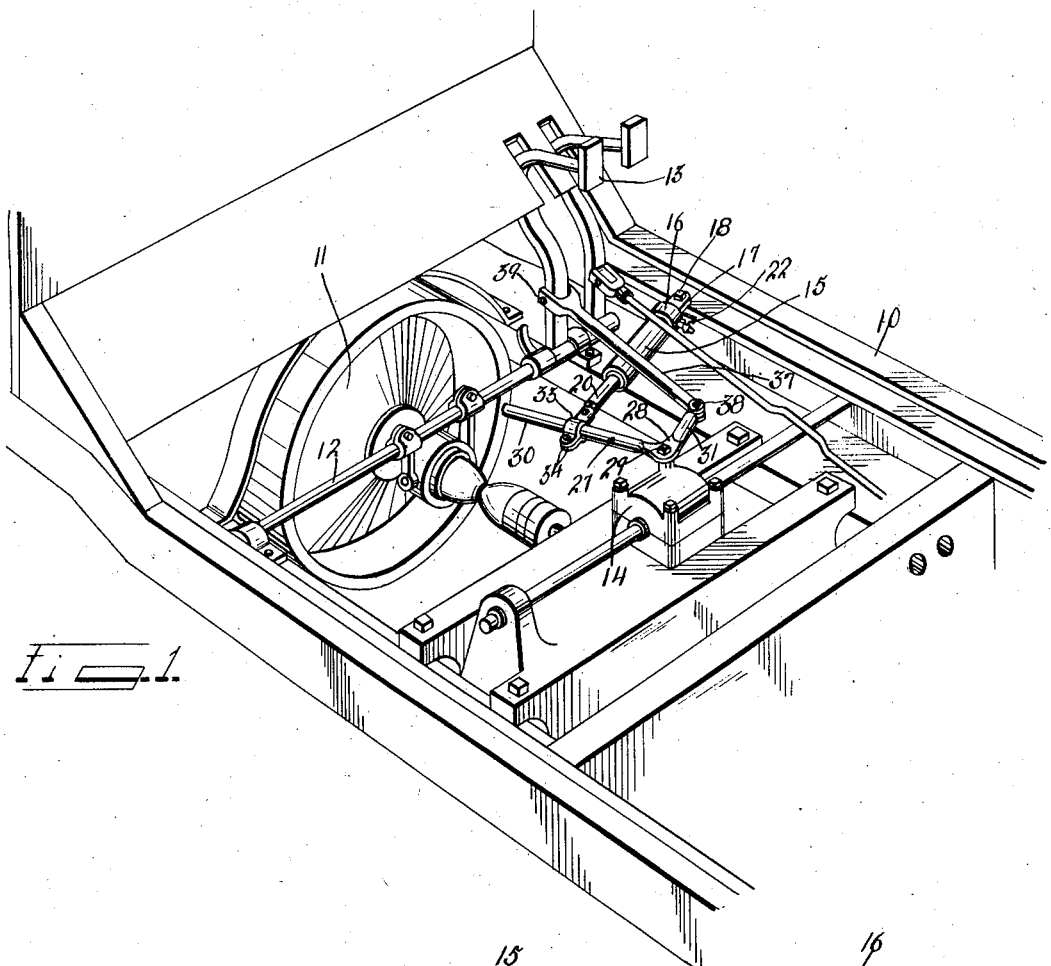
Figure 2:
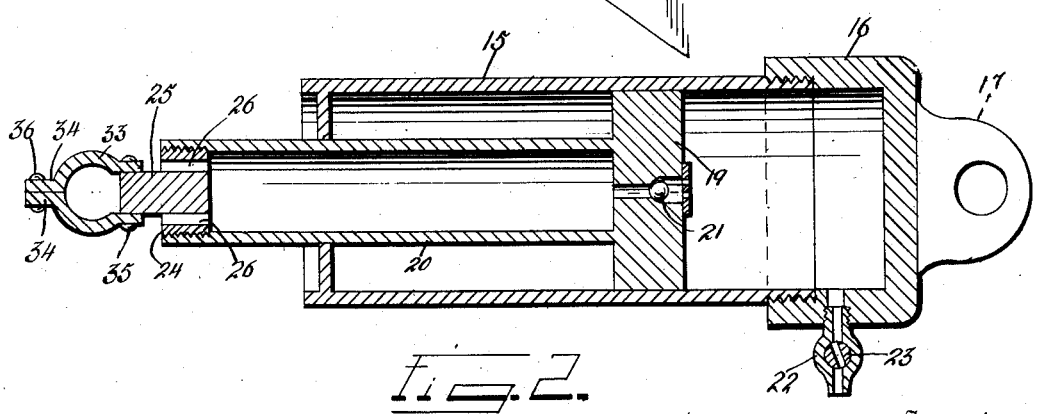

In the accompanying drawing forming part of this specification:—Figure 1 is a fragmentary perspective view of an automobile with the foot board removed to expose the clutch assembly and my improved pneumatic attachment applied thereto. Fig. 2 is a longitudinal sectional view through the cylinder.

Referring now to the drawing in which like characters of reference designate similar parts, 10 designates in general the chassis, 11 the cone clutch, 12 the actuating shaft, 13 the clutch pedal, and 14 the change gear casing of an ordinary automobile. These parts form no part of the present invention which instead reside in a pneumatic attachment for controlling the return movement of the clutch pedal and thereby cause a gradual engagement of the clutch.

A chamber or cylinder 15 is closed at one end by a flange cap 16 which is centrally provided with an orificed lug 17 through which and the chassis rail is passed a single pivot bolt 18 which permits of the cylinder rocking slightly for a purpose which will hereinafter appear. Working in the cylinder is a piston 19 the stem 20 of which is hollow to permit of air entering the piston and filling the cylinder during outward movement of the piston, a valve 21 being arranged in the piston and forming a closure for the piston rod, this valve opening and permitting of air entering the cylinder closing and compressing the air within the cylinder during inward movement of the piston. A pet cock 22 is arranged in the cylinder wall adjacent to the secured end of the cylinder and permits of the escape of air from the cylinder to the atmosphere, the valve 23 of this cock being manually regulated to permit of a fast or slow discharge of air from the cylinder during inward or compression movement of the piston. The extreme outer end of the piston stem is closed by a plug 24 which is provided axially with an outwardly extending orificed lug 25 which forms means for actuating the piston, and is further provided with a circular series of inlet openings 26 which permit of air entering through the hollow piston during outward movement of the piston.

A bell crank lever 27 preferably formed of metallic tubing is provided at its elbow with a flattened portion 28 which is designed to loosely receive the shank of one of the bolts which secure the change gear casing cap to the body of the casing, the nut 29 of this bolt being advanced upon the bolt after application of the bell crank lever and pivotally retains the bell crank lever in position. One leg of the bell crank lever is of considerably greater length than the mating leg, and the legs will be hereinafter referred to as the long leg 30 and the short leg 31 of the bell crank lever. The long leg of the bell crank lever extends in the direction of the cone clutch actuating shaft and is disposed in a plane with the cylinder piston rod. A clamp 32 is adjustably mounted upon the long leg, and is preferably formed of two approximately semi-circular sections 33, the ends of which are turned outwardly and form parallel lips 34. The orificed lug 25 of the piston is inserted between the lips upon one side of the clamp, and a bolt 35 passed through the parts to secure the clamp to the piston rod. A bolt 36 is passed through the other pair of lips of the clamp, and loosening of this bolt permits of the halves of the clamp being spread apart so that the clamp may be adjusted to any desired position longitudinally upon the long leg of the bell crank lever in order that the length of the stroke of the piston may be varied.

A link 37 preferably formed of tubular material is bifurcated at its opposite ends, one of said bifurcated ends embracing the extreme end of the bell crank lever short leg and a pivot bolt 38 being passed through the parts to pivotally secure the link to the bell crank lever. The opposite bifurcated end of the link embraces the shank of the clutch pedal 13, and a bolt 39 is passed through the link and pedal shank to pivotally secure the parts together.

The operation of the device is as follows:—Upon depression of the pedal 13, through the instrumentality of the link 37, the bell crank lever is rocked upon its pivot and causes the piston to be drawn outwardly through the cylinder, air will then enter through the hollow piston and accumulate within the cylinder. During this depression of the pedal, the cone clutch through the instrumentality of the usual pedal connection with the cone clutch operating shaft will be disengaged. Now upon the foot being removed from the pedal, the latter through the instrumentality of the clutch controlling spring will be elevated simultaneously with the return of the cone clutch to engaged position. During this elevating movement of the pedal through the instrumentality of the link 37 and bell crank lever 27, the piston will be moved inwardly within the cylinder and compress the air in the cylinder, the air escaping slowly through the pet cock and retarding, through the instrumentality of the bell crank lever link and pedal, the engaging movement of the clutch spring. In this manner the clutch will be gradually and uniformly engaged, and it is evident that by manipulating the valve of the pet cock the air within the cylinder may be allowed to escape quickly or slowly so that the engaging of the clutch may be accomplished in a minimum time or maximum time as desired to suit varying conditions of service.

It is deemed of importance that the piston be adjustably connected to the long leg of the bell crank lever. It is clear through the instrumentality of this connection, that the leverage exerted upon the piston through the instrumentality of the bell crank lever may be increased as the clamp is moved in the direction of the lever pivot, the cylinder swinging on its pivot bolt 18 to accommodate this movement. Conversely the leverage upon the piston may be decreased as the clamp is moved toward the free end of the bell crank lever long leg. In this manner compressive force of the piston in compressing the air during inward movement of the cylinder may be increased or diminished, and by virtue of this adjustment the clutch controlling spring may be retarded in its engaging action independent of the pet cock adjustment above described so that the latter may be set in one position and maintained permanently in this position if desired.

What is claimed, is:—

The combination with an automobile chassis, and clutch controlling pedal, of a bell crank lever pivoted at its elbow on said chassis and having legs projecting toward said pedal, a dash pot pivoted to the chassis side intermediate said lever and said pedal, a link pivotally connected to one leg of said lever and extending over said dash pot, and pivotally connected to said pedal, and a clamp carried by the dash pot rod and adjustably secured to the other leg of said bell crank lever.

In testimony whereof, I affix my signature, in presence of two witnesses.

IRVINE M. SMITH.

Witnesses:
 J. S. STEPHENS,
 ROLLIE W. WATSON.